United States Patent
Schmidt et al.

(10) Patent No.: US 8,029,019 B2
(45) Date of Patent: Oct. 4, 2011

(54) ROPS MOUNTING ASSEMBLY

(75) Inventors: Keith Schmidt, Cedar Falls, IA (US); Bernard M. Gruman, Harpers Ferry, IA (US); Mukund Rao, Waxhaw, NC (US); Craig Fanton, Waterloo, IA (US); Arpit Shah, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/361,932

(22) Filed: Jan. 29, 2009

(65) Prior Publication Data
US 2010/0187799 A1 Jul. 29, 2010

(51) Int. Cl.
B60R 21/13 (2006.01)
(52) U.S. Cl. .................................................. 280/756
(58) Field of Classification Search .................. 280/756
See application file for complete search history.

(56) References Cited

U.S. PATENT DOCUMENTS

| | | | |
|---|---|---|---|
| 2,546,453 A | 3/1951 | Koenig | |
| 3,443,833 A | 5/1969 | Miller et al. | |
| 3,656,799 A | 4/1972 | Malm et al. | |
| 3,656,803 A * | 4/1972 | Brown et al. | 296/102 |
| 3,732,941 A | 5/1973 | Davis et al. | |
| 3,791,668 A | 2/1974 | Adams | |
| 3,985,386 A | 10/1976 | Woods | |
| 4,049,294 A * | 9/1977 | Atherton | 280/756 |
| 4,600,236 A | 7/1986 | Weiss et al. | |
| 4,669,565 A | 6/1987 | Miki et al. | |
| 4,877,265 A | 10/1989 | DeBraal et al. | |
| 5,129,676 A * | 7/1992 | Sheehan | 280/756 |
| 5,388,884 A * | 2/1995 | Keehner et al. | 296/190.03 |
| 7,396,047 B1 | 7/2008 | Young | |
| 7,438,319 B2 | 10/2008 | Cooper et al. | |

FOREIGN PATENT DOCUMENTS

JP 2001206178 7/2001

\* cited by examiner

*Primary Examiner* — Paul N Dickson
*Assistant Examiner* — Robert A Coker

(57) ABSTRACT

A mounting assembly is provided for a vehicle ROPS unit which includes two legs. Each mounting assembly includes a base plate fixed to an end of a corresponding leg, a support plate, a top plate and a resilient bushing unit which separates the base plate from the support and top plates. The base plate is sandwiched between the support plate and the top plate. The bushing unit includes first and second resilient bushing members and a rigid hollow central sleeve. The bushing unit is received by a bore in the base plate. The support plate includes hollow mounting towers which project into bores in the base plate. Cap screws attach the mounting assembly to a vehicle axle housing. The top plate and the support plate are fixed to each other and to a frame of the vehicle.

14 Claims, 7 Drawing Sheets

ROPS MOUNTING ASSEMBLY

FIELD OF THE INVENTION

The present invention relates generally to roll-over protective structures for vehicles and more particularly to such structures which are isolated from vibrations.

BACKGROUND OF THE INVENTION

Many vehicles, including agricultural tractors, are provided with some form of roll-over protection structure or system, or ROPS. ROPS are designed to prevent the vehicle from crushing the operator if it accidentally rolls over. A ROPS structure must handle rear, side, & front roll-over loads. Most ROPS structures have included upright supports which require rigidity-adding longitudinal and lateral cross members topped by a canopy. Such structures are shown in the U.S. Pat. No. 3,787,085 granted to D. H. Bucher, et al on Jan. 22, 1974, and the U.S. Pat. No. 3,841,430 granted to J. H. Babbitt, Jr., et al on Oct. 15, 1974.

One common ROPS used on small agricultural tractors is a U-shaped bar. The lower ends of the U are attached to the frame of the tractor. As a result, vibrations in the frame are transmitted into the ROPS and the base of the U is positioned in the vicinity of the operator station of the vehicle. Other ROPS designs require a platform structure running forward to front mounts to help handle the loads, similar to a cab frame. Such a typical ROPs is not isolated from vibrations. Noise and vibration in the ROPS can be transmitted to a nearby vehicle operator.

SUMMARY OF THE INVENTION

Accordingly, an object of this invention is to provide a compact, cost effective ROPS mounting assembly.

A further object of the invention is to provide such a ROPS mounting assembly which isolates the ROPS unit from vibration and noise.

These and other objects are achieved by the present invention, wherein a mounting assembly is provided for a ROPS unit. The ROPS unit includes two legs or struts and a crossbar. Each mounting assembly includes a base plate fixed to an end of a corresponding leg, a support plate, a top plate and a resilient bushing unit separating the base plate from the support plate and from the top plate. The base plate is sandwiched between the support plate and the top plate. The bushing unit includes a first resilient bushing member separating the base plate from the support plate, and a second resilient bushing member separating the base plate from the top plate. The bushing unit also includes a rigid hollow sleeve which is received by the first and second resilient bushing members. One of the bushing members comprises a larger diameter cylindrical base and a small diameter cylindrical shaft. The shaft is received by a bore in the base plate. The other bushing members is an annular member which is partially received by a recess in the base plate. The base plate includes a bushing bore extending therethrough, and an annular bushing recess surrounds one end of the bushing bore. The support plate includes hollow mounting towers which project into bores in the base plate. Cap screws extend through the mounting assembly and attach it to a part of the vehicle, such as an axle housing. One of the cap screws extends through the bushing unit.

DESCRIPTION OF THE PREFERRED EMBODIMENT

Figure 1:
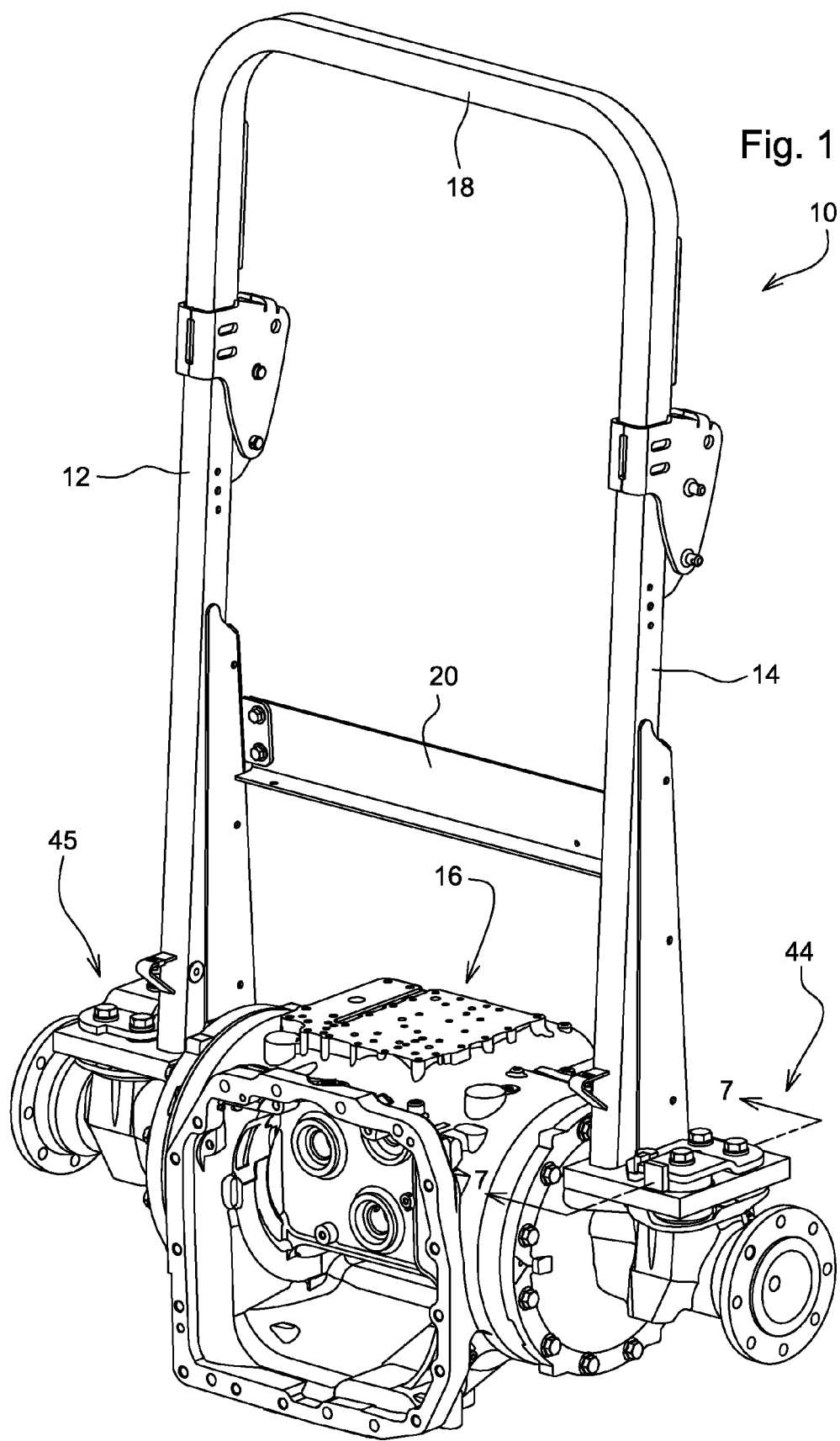
FIG. 1 is a perspective view of a ROPs member mounted on a vehicle axle housing according to the present invention.
Figure 2:
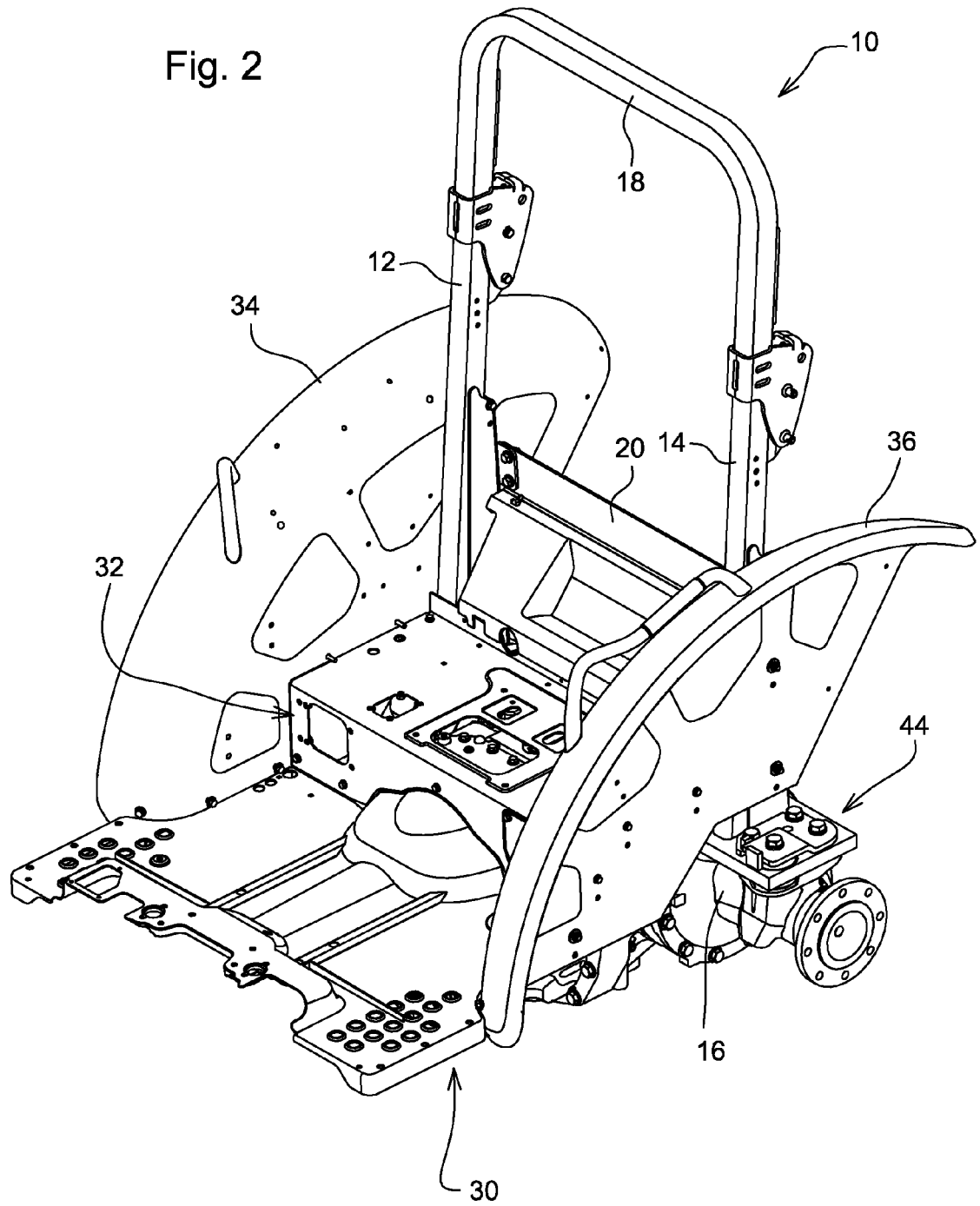
FIG. 2 is a perspective view showing the ROPS mounting assembly of FIG. 1 together with a seat and fender assembly.
Figure 3:
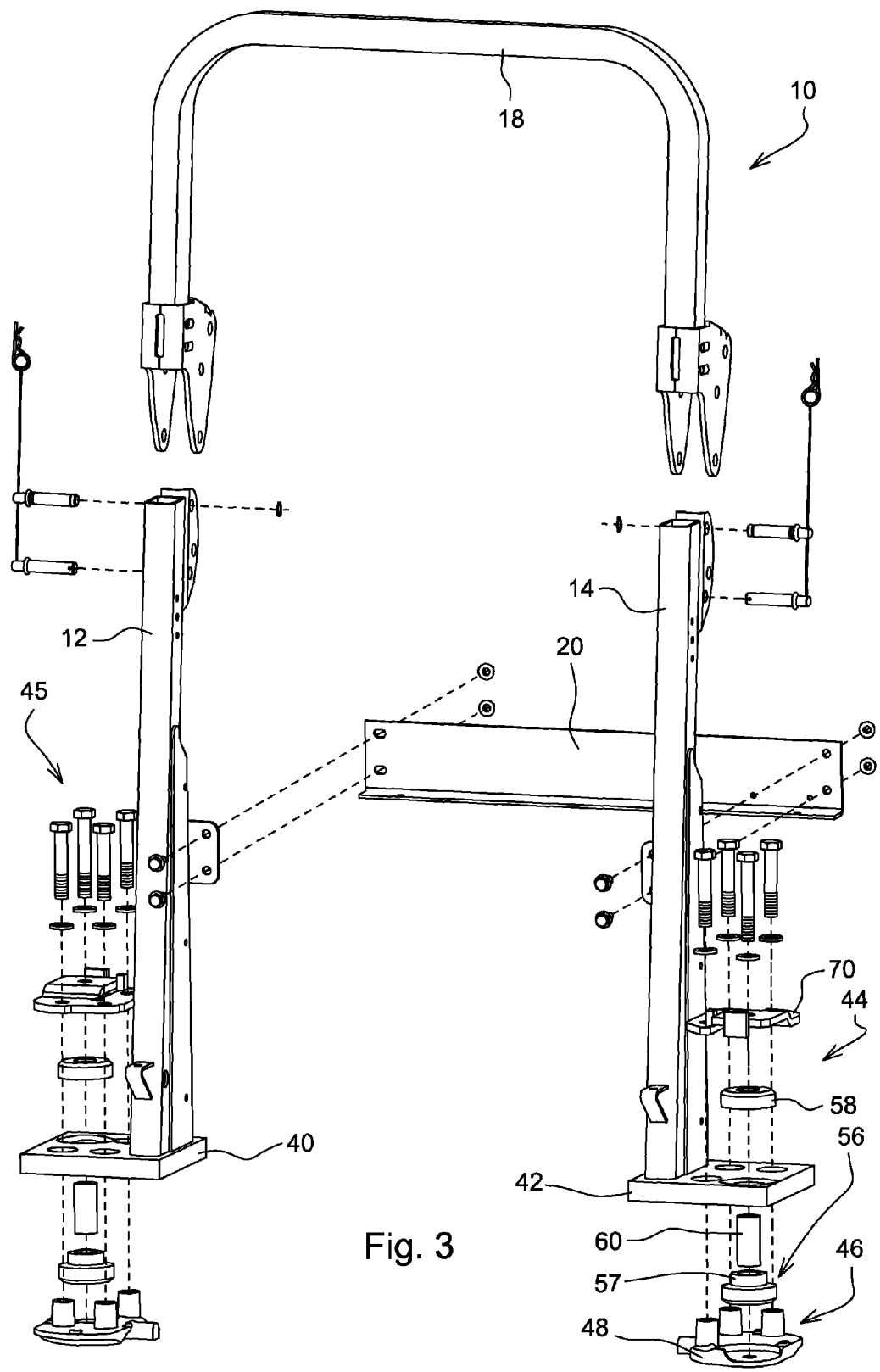
FIG. 3 is a perspective exploded view showing the ROPS mounting assembly of FIG. 1.
Figure 4:
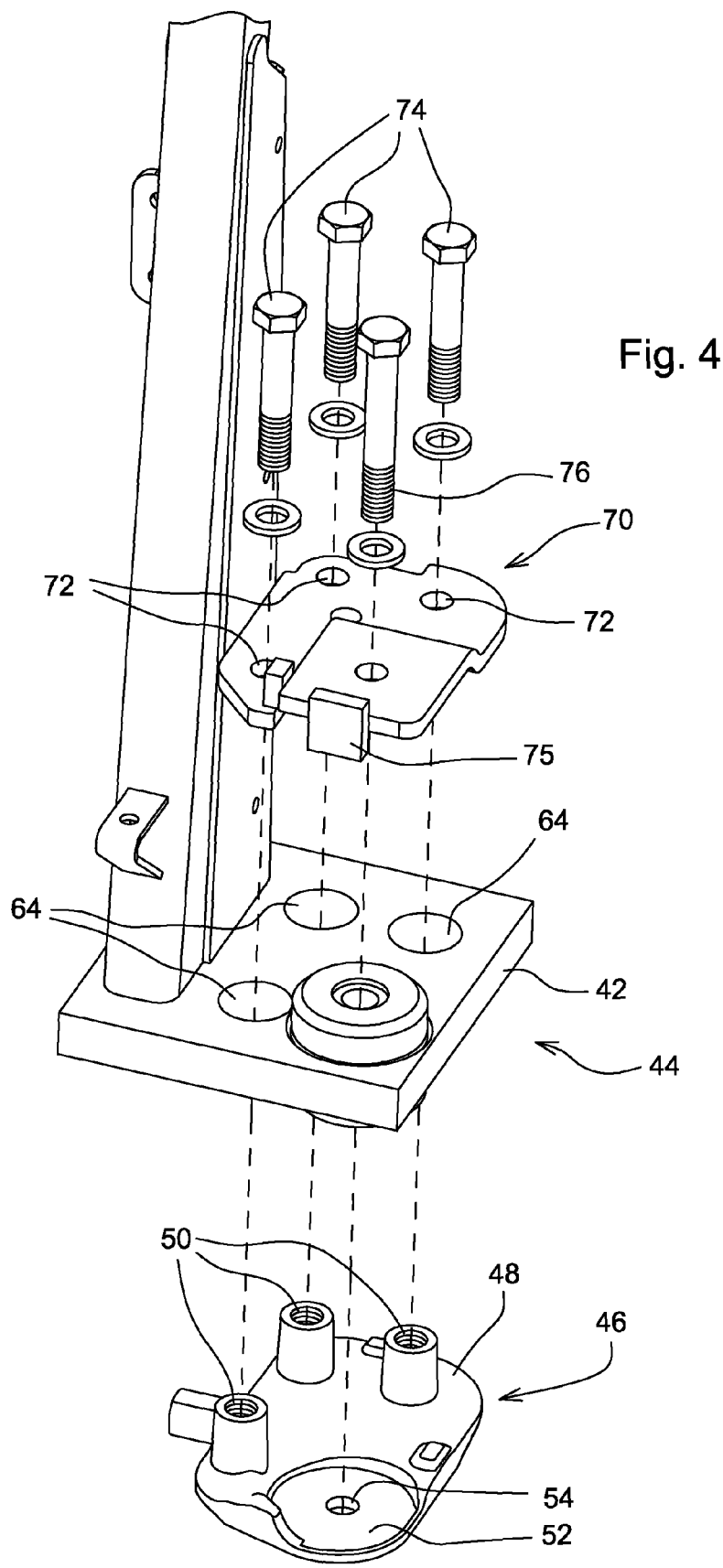
FIG. 4 is a detailed perspective exploded view showing a portion of the ROPS mounting assembly of FIG. 1.
Figure 5:
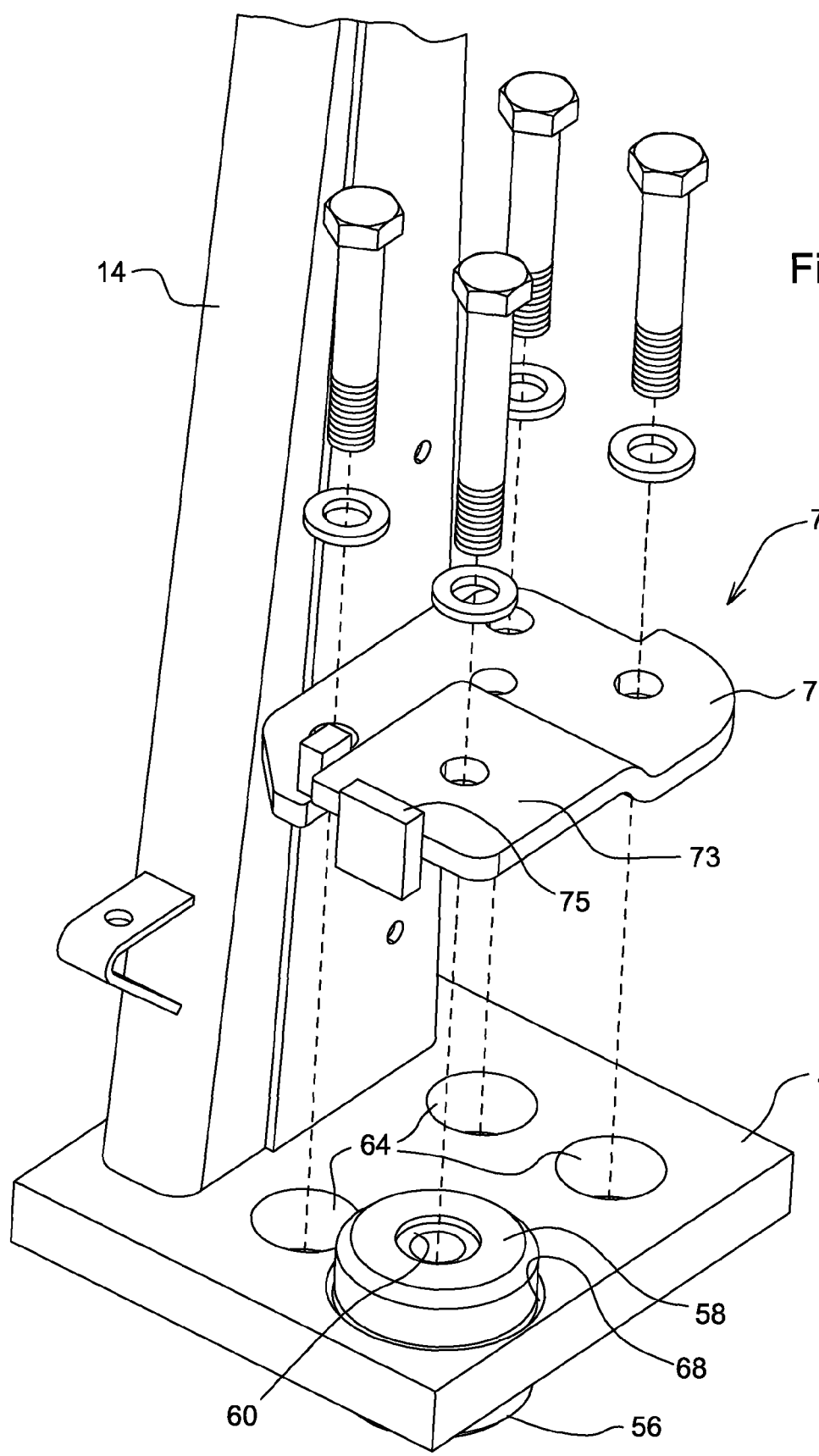
FIG. 5 is a detailed perspective assembly view showing the base plate of ROPs mounting assembly of FIG. 1.
Figure 6:
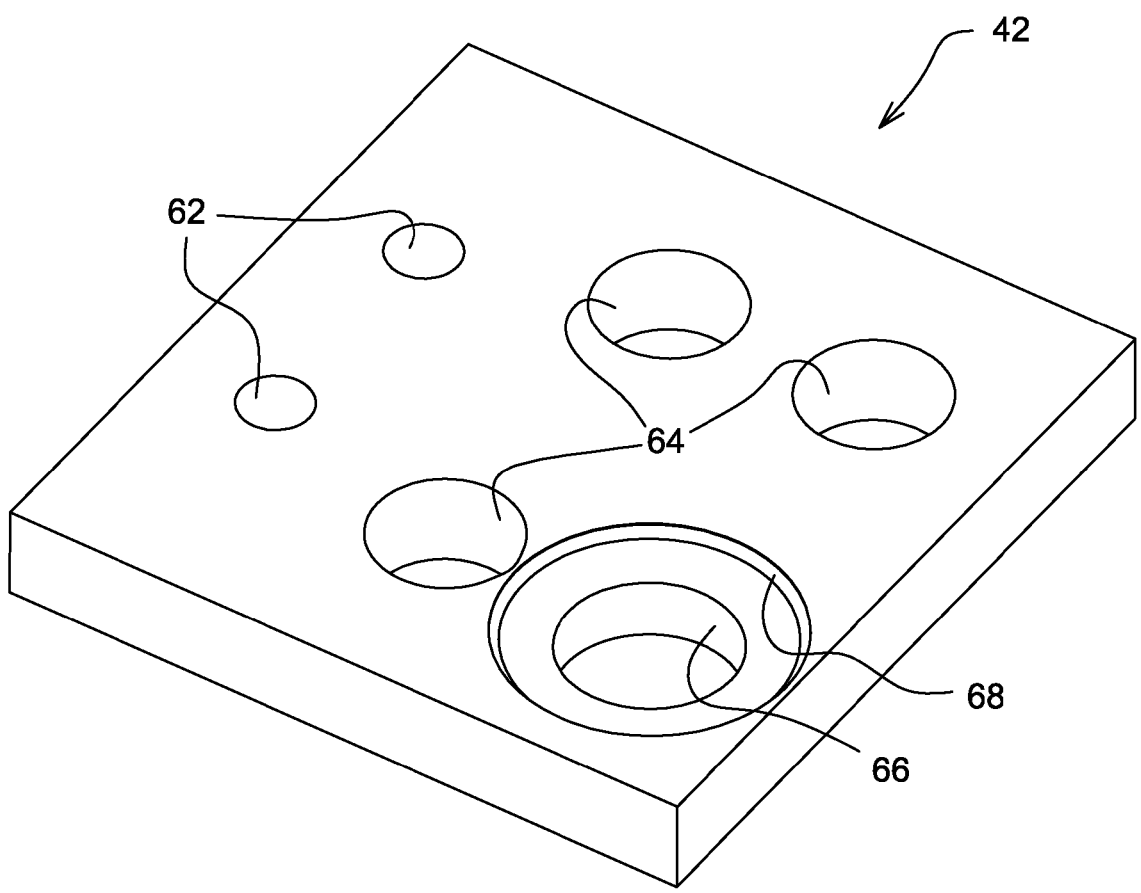
FIG. 6 is a detailed perspective view showing only the base plate of ROPs mounting assembly of FIG. 1.

Referring to FIGS. 1 and 2, an inverted U-shaped ROPS unit 10 has a pair of legs 12 and 14 which are mounted on a vehicle axle housing 16. ROPS unit 10 includes an inverted U-shaped upper part 18 which is pivotally coupled to legs 12 and 14. Upper part 18 may be pivotally lowered during low clearance transport conditions. A cross piece or brace 20 extends between and connects legs 12 and 14. An assembly 30 is also mounted on the axle housing 16. Assembly 30 includes a seat and floor platform 32 and a pair of fenders 34 and 36. The legs 12 and 14 are preferably attached to the corresponding adjacent fenders 34 and 36.

Referring to FIGS. 3-6, the ROPS unit 10 includes a pair of bottom plates 40 and 42 which are welded to the bottom ends of legs 12 and 14, respectively. Each of plates 40 and 42 are coupled to the axle housing 16 by a corresponding and complimentary vibration isolating mounting assembly 44, 45.

Mounting assembly 44 will be described in detail hereinafter, with the understanding that mounting assembly 45 is similar and may be a mirror image of mounting assembly 44. Mounting assembly 44 includes a support 46 which is preferably a cast part. Support 46 includes a base 48 from which project hollow internally threaded fingers or towers 50. A recess 52 is formed in the base 48, and a bore 54 extends through the base at or near the center of the recess 52.

Mounting assembly 44 also includes a lower resilient bushing or isolator 56, an upper resilient bushing or isolator 58 and a hollow rigid, preferably steel, sleeve 60. Bushing 56 is received by recess 52 between the support 46 and the plate 42. Plate 42 includes a pair of drain holes 62 for cap screws which attach the plate 42 to the leg 14. Plate 42 also includes bores 64 which receive the fingers 50 and a bore 66 which receives the bushing 56 and the sleeve 60. A shallow annular recess 68 surrounds bore 66 and receives the lower end of bushing 58. Bore 66 receives a reduced diameter portion 57 of lower bushing 56.

Mounting assembly 44 also includes a top plate 70 which mounted over the upper bushing 58 and the plate 42. Top plate 70 includes lower part 71 and a upper part 73. Lower part 71 engages the upper ends of two of the towers 50. Upper part 73 engages an upper end of the bushing 58. Top plate 70 also includes a spacer tab 75 which projects from the upper part 73. Top plate 70 includes bolt holes 72 which receive threaded members or cap screws 74 and 76. Cap screws 74 and 76 extend through the mounting assembly 44 and are threaded into threaded bores 80 in the upper surface of the axle housing 16 (two of which are visible in FIG. 7). Cap screws 74 extend through bolt holes 72, bores 64 and the towers 50. The other cap screw 76 extends through one of bolt holes 72, sleeve 60 of the bushing unit, bore 66 and bore 54. The towers 50 extend into the bores 64 in the base plate 42 and the bushing unit is received in bore 60 of the base plate 42.

Figure 7:
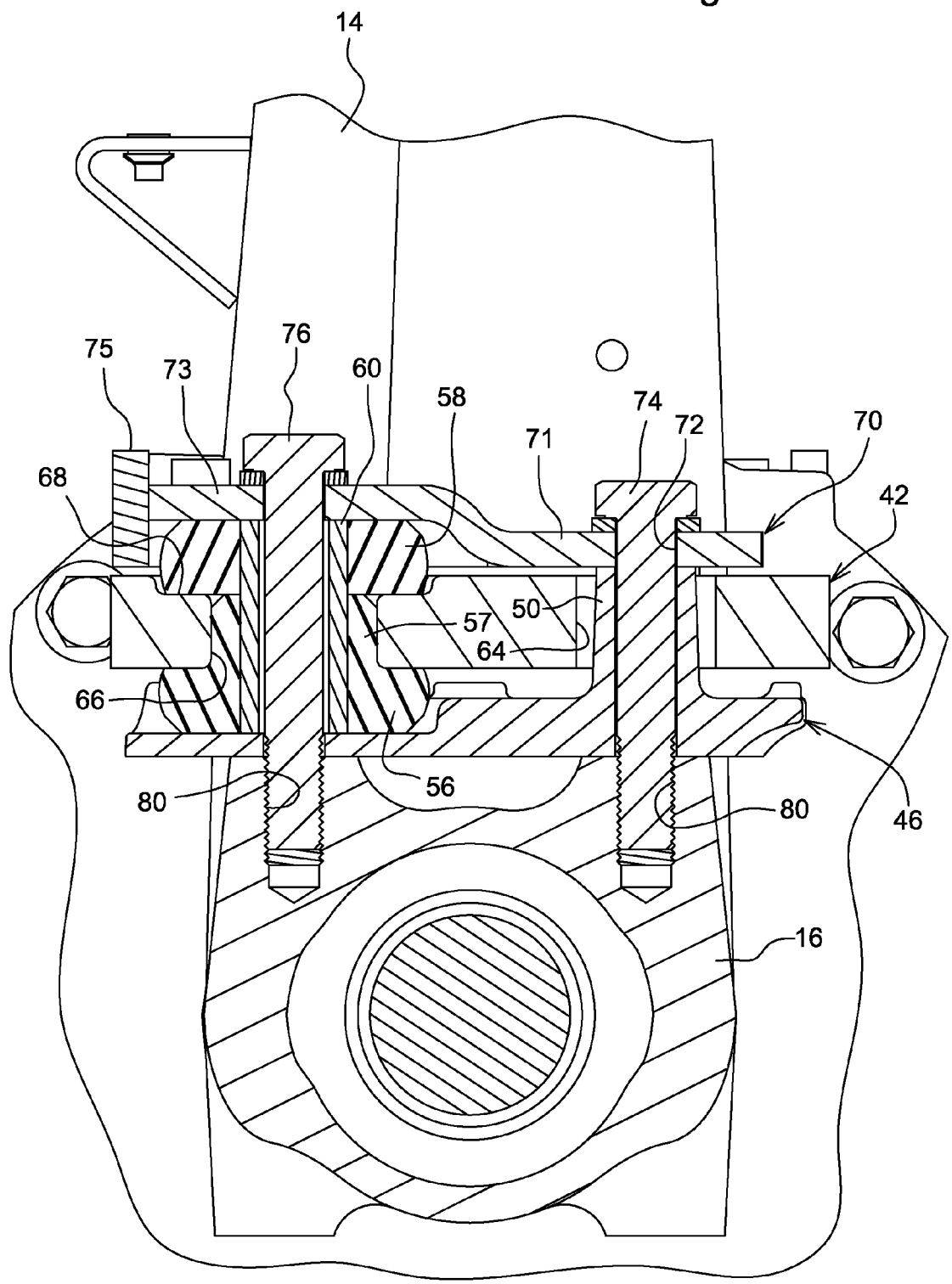
FIG. 7 is a sectional view along lines 7-7 of FIG. 5.

As best seen in FIG. 7, in a normal non-roll condition, the lower part 71 of the top plate 70 engages only an upper end of the rear two towers 50 of the support plate 48 and is spaced apart from the base plate 42. The upper part 73 of the top plate 70 engages only the upper isolator 58 and the upper end of the sleeve 60, and is spaced apart from the base plate 42. The lower end of tab 75 is also spaced apart from the base plate 42. The four cap screws 74, 76 and the washers engage the top of the top plate 70. The bottom support plate 48 engages and rests on the axle housing 16 and supports the top plate 70 and bottom isolator 56. The base plate 42, (in a nominal, non-roll condition) only engages the top isolator 58 and the bottom isolator 56 as it free floats between and spaced apart from the support plate 46 and the top plate 70.

With this mounting assembly, the ROPS unit 10 is resiliently coupled to the axle housing 16 and is isolated from the axle housing 16 with respect to vibration and noise. This mounting assembly is compact, cost effective and meets the necessary roll-over requirements and safety standards (loads & zone of clearance).

In normal operating conditions the base plate 42 does not contact either the bottom casting 46 or the top plate 70. A nominal gap is maintained on both sides of the plate 42 which allows them to move up and down for isolation purposes. The bottom casting or support 46 mates to the rear axle housing 16 and acts as a spacer. The support 46 provides the mounting points (three towers 50) for the top plate 70, a mounting pad for the isolator bushing 56, and absorbs the reaction loads during a roll-over condition. The top plate 70 is bolted to the towers 50 of the support 46. The top plate 70 engages the top portion of the upper isolator or bushing 58. The cap screws 74, 76 engage the upper surface of the top plate 70, which supports the reaction loads during a roll-over condition. Each mounting assembly includes four cap screws 74, 76 to secure and retain each side of the ROPS unit 10.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A pair of mounting assemblies for mounting a roll-over protection structure (ROPS) on a vehicle, the ROPS having a pair of legs, each mounting assembly comprising:
a base plate fixed to an end of a corresponding leg;
a support plate fixed with respect to a frame of the vehicle;
a top plate fixed with respect to a frame of the vehicle, the base plate being sandwiched between the support plate and the-top plate;
a resilient bushing unit resiliently coupling the base plate to the support plate and the top plate, the bushing unit comprises a first resilient bushing member separating the base plate from the support plate, and a second resilient bushing member separating the base plate from the top plate, the base plate including a bushing bore extending therethrough; and
an annular bushing recess surrounds one end of the bushing bore, the first bushing member comprises a larger diameter cylindrical base and a small diameter cylindrical shaft projecting therefrom, the shaft being received by the bushing bore, and the second bushing member comprises an annular member which is partially received by the bushing recess.

2. The mounting assembly of claim 1, wherein:
the bushing unit further comprises a rigid hollow sleeve which is received by the first and second resilient bushing members.

3. The mounting assembly of claim 1, wherein:
one of the first and second bushing members comprises a larger diameter cylindrical base and a small diameter cylindrical shaft projecting therefrom, the shaft being received by a bore in the base plate.

4. The mounting assembly of claim 1, wherein:
one of the first and second bushing members comprises an annular member which is partially received by a recess in the base plate.

5. The mounting assembly of claim 1, wherein:
the bushing unit further comprises a rigid hollow sleeve which is received by the first and second bushing members and by the bushing bore.

6. The mounting assembly of claim 5, wherein:
a plurality of threaded members for fastening the top plate and the support plate to the vehicle, one of the threaded members extending through the hollow sleeve, the first and second bushing members and the bushing bore.

7. The mounting assembly of claim 1, wherein:
a plurality of threaded members for fastening the top plate and the support plate to the vehicle, one of the threaded members extending through the bushing unit and the base plate.

8. The mounting assembly of claim 1, wherein:
a tab projects from the top plate, the tab normally being spaced apart from the base plate, the tab being engagable with the base plate under a roll-over condition.

9. The mounting assembly of claim 1, wherein the top plate comprises:
a lower part engaging the base plate;
an upper part engaging the bushing unit; and
a tab projecting from the top plate, the tab normally being spaced apart from the base plate, the tab being engagable with the base plate under a roll-over condition.

10. The mounting assembly of claim 1, wherein:
the top plate and the support plate are rigidly attached to the vehicle.

11. The mounting assembly of claim 1, wherein:
a portion of the top plate is engagable with the base plate under a roll-over condition and is normally spaced apart from the base plate.

12. A pair of mounting assemblies for mounting a roll-over protection structure (ROPS) on a vehicle, the ROPS having a pair of legs, each mounting assembly comprising:
a base plate fixed to an end of a corresponding leg;
a support plate fixed with respect to a frame of the vehicle;
a top plate fixed with respect to a frame of the vehicle, the base plate being sandwiched between the support plate and the top plate;
a resilient bushing unit resiliently coupling the base plate to the support plate and the top plate;
a plurality of mounting bores extend through the base plate; and
the support plate includes a plurality of hollow mounting towers, each tower projecting into a corresponding one of the mounting bores.

13. The mounting assembly of claim 12, wherein:
a plurality of threaded members for fastening the top plate and the support plate to the vehicle, each threaded member extending through the top plate and a corresponding one of the towers.

14. A pair of mounting assemblies for mounting a roll-over protection structure (ROPS) on a vehicle, the ROPS having a pair of legs, each mounting assembly comprising:
- a base plate fixed to an end of a corresponding leg;
- a support plate fixed with respect to a frame of the vehicle;
- a top plate fixed with respect to a frame of the vehicle, the base plate being sandwiched between the support plate and the top plate; and
- a resilient bushing unit resiliently coupling the base plate to the support plate and the top plate, the support plate including a plurality of hollow mounting towers, each tower projecting into a corresponding one of the mounting bores, and the top plate engaging an end of the towers.

\* \* \* \* \*